Patented Sept. 25, 1923.

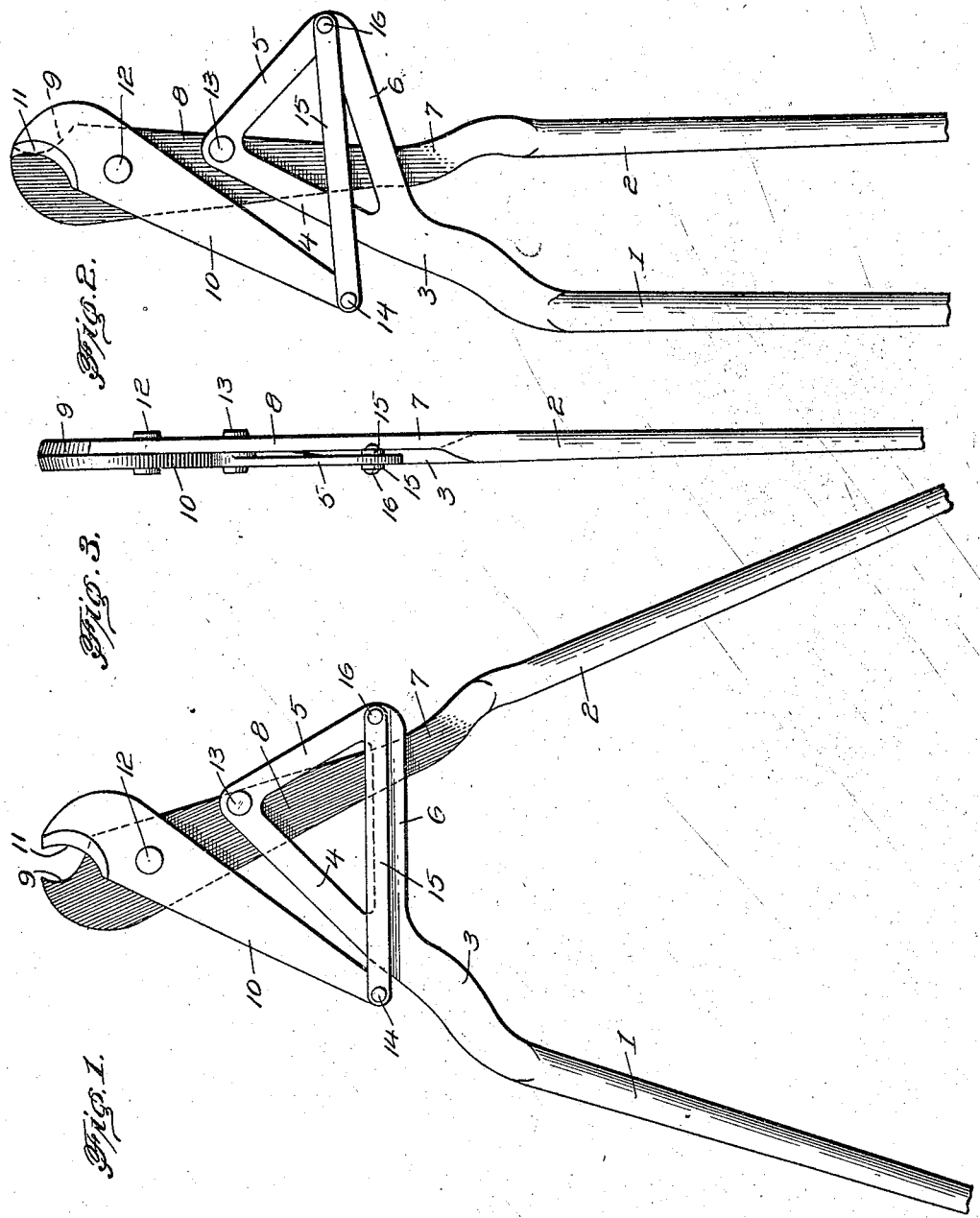

1,469,072

UNITED STATES PATENT OFFICE.

WALTER L. DODSON, OF EDNA, TEXAS.

CLIPPER.

Application filed August 10, 1922. Serial No. 580,961.

*To all whom it may concern:*

Be it known that I, WALTER L. DODSON, a citizen of the United States, residing at Edna, in the county of Jackson and State of Texas, have invented certain new and useful Improvements in Clippers, of which the following is a specification.

This invention relates to a clipping tool designed primarily for clipping off the ends of the horns of cattle from two to three inches, but it is to be understood that it can be employed for de-horning of cattle when desired, or for any other purposes where it is found applicable and has for its object to provide as in a manner set forth, a tool of such class with means to increase the leverage for the cutting jaw of the tool to provide for the expeditious clipping of the horns of cattle, so as to prevent cows or steers from hooking and skinning one another when feeding, driving, shipping and dipping.

Further objects of the invention are to provide a clipping tool for the purpose set forth, which is extremely simple in its construction and arrangement, strong, durable, efficient and convenient in its use, readily assembled, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation of a clipping tool in accordance with this invention, the elements thereof being extended with respect to each other, Figure 2 is a like view with the elements thereof closed with respect to each other, Figure 3 is an edge view of the tool.

Referring to the drawings in detail, 1 and 2 denote a pair of handle members, and each of which is of a desired length for convenient handling and cylindrical in cross section.

The handle member 1 terminates in an inwardly projecting curvilinear extension 3 which merges at its upper terminus into a head of skeleton formation of substantially equilateral triangular contour and consists of a pair of side bars 4, 5 and a base bar 6. The bars 4, 5, at the outer termini are formed integral with each other. The bar 4, at its inner terminus is integral with the outer terminus 6 and the bar 5, at its inner terminus is integral with the inner terminus of the bar 6.

The handle member 2 terminates in an inwardly projecting curved extension 7, which merges into the tapering shank 8 formed with a jaw 9. The shank 8 gradually increases in width outwardly and the jaw 9 is formed by cutting away the outer portion of the outer edge of shank 8. The jaw 9 is curvilinear in contour and is not provided with a cutting edge.

Pivotally connected to the shank 8 at a point between its center and the outer end thereof, is the shank 10 of a cutting jaw 11, the latter cooperates with the jaw 9 for clipping or de-horning purposes. The jaw 11 is formed by cutting away the outer portion of the outer edge of the shank 10 and is curvilinear in contour. The pivot for the shanks 8 and 9, is indicated at 12, and extends through the said shanks thereby maintaining one against the other but permitting of the opening and closing of the jaws 9, 11, relative to each other when desired.

The apex of the triangular shaped head is arranged against the shank 8, that is, the inner face of shank 8, and is pivoted or fulcrumed at a point in proximity to the outer edge of the shank 8 and inwardly with respect to the pivot 12. The pivot or fulcrum for the triangular shaped head, is indicated as at 13, and extends through the head and the shank 8.

The shank 10 is tapered and gradually increases in width from its inner toward its outer end, and is of a length as to extend when the elements of the tool are extended to a position in proximity to the base bar 6 of the triangular shaped head. The shank 10 is arranged to one side of the triangular shaped head, and has its lower end pivotally connected, as at 14, to a lever arm 15, the latter projecting across the outer face of the bar 6, and is pivotally connected as at 16, to the inner terminus of the bar 5 and in proximity to the edge thereof.

The connections between the shank 10 and the handle member 1, such connections being the triangular shaped head and the lever arm 15, due to the dispositions of the pivots 13, 14 and 16, with respect to the shank 10, the lever arm 15, the triangular shaped head and shank 8, increase the leverage of shifting the jaw 11 for clipping purposes, that is to say, increasing the power during the operation of clipping, or in other words, the power of leverage is increased as the jaws 9 and 11 close.

What I claim is:—

1. A clipping tool comprising a pair of jaw shanks pivotally connected together and each provided with a jaw on its outer edge, a triangular shaped head pivotally connected to one of said jaw shanks at a point inwardly of and to one side of the pivot between the jaw shanks, a lever arm pivoted to said head inwardly and to one side with respect to the pivot of said head, means for pivotally connecting the other end of said lever arm to the other of the jaw shanks at one side of the pivot between said shanks, a handle member carrying that jaw shank to which the head is pivoted, and a handle member carrying said head.

2. A clipping tool comprising a pair of jaw shanks pivotally connected together and each provided with a jaw, a triangular shaped head pivotally connected at its apex to one of said jaw shanks, a lever arm having one end pivoted to the base of said head at one side thereof and projecting beyond the other side of the base and pivotally connected to the inner end of the other jaw shank, a handle member carrying that jaw shank to which the head is pivoted, and a handle member carrying said head.

3. A clipping tool comprising a pair of jaw shanks pivotally connected together and each provided with a jaw, a triangular shaped head pivotally connected to one of said jaw shanks and with the pivot eccentrically disposed with respect to the longitudinal center of the said jaw shank, a lever arm having one end pivoted to said head at one side of the center thereof and its other end projecting from the other side of the said head and pivotally connected to the inner terminus of the other of said jaw shanks, a handle member carrying that shank to which the head is pivoted, and a handle member carrying said head.

In testimony whereof I affix my signature hereto.

WALTER L. DODSON.